United States Patent
Tan

(10) Patent No.: US 10,567,659 B2
(45) Date of Patent: Feb. 18, 2020

(54) IMAGE COMPENSATION METHOD, ELECTRONIC DEVICE AND COMPUTER-READABLE STORAGE MEDIUM

(71) Applicant: Guangdong OPPO Mobile Telecommunications Corp., Ltd., Dongguan, Guangdong (CN)

(72) Inventor: Guohui Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/242,656

(22) Filed: Jan. 8, 2019

(65) Prior Publication Data

US 2019/0387169 A1    Dec. 19, 2019

(30) Foreign Application Priority Data

Jun. 15, 2018 (CN) .......................... 2018 1 0623844

(51) Int. Cl.
*H04N 5/232* (2006.01)
*H04N 5/247* (2006.01)
(Continued)

(52) U.S. Cl.
CPC ........... *H04N 5/23267* (2013.01); *G06T 7/73* (2017.01); *G06T 7/80* (2017.01); *H04N 5/23258* (2013.01);
(Continued)

(58) Field of Classification Search
CPC ........... H04N 5/23267; H04N 5/23287; H04N 17/002; H04N 5/23258; H04N 5/247; G06T 7/73; G06T 7/80
See application file for complete search history.

(56) References Cited

U.S. PATENT DOCUMENTS 10,429,608 B1 * 10/2019 Baer .................. G02B 7/285
2006/0170784 A1   8/2006 Clarke et al.
(Continued)

FOREIGN PATENT DOCUMENTS

CN       104967785 A       10/2015
CN       107040705 A        8/2017
(Continued)

OTHER PUBLICATIONS

International search report issued in corresponding international application No. PCT/CN2019/090196 dated Aug. 27, 2019.
(Continued)

*Primary Examiner* — Timothy J Henn
(74) *Attorney, Agent, or Firm* — Young Basile Hanlon & MacFarlane, P.C.

(57) ABSTRACT

An image compensation method is provided, which includes: acquiring a Hall value of an electronic device that is provided with a first camera and a second camera, at least one of the first camera and the second camera is provided with an optical image stabilization system; acquiring a lens bias corresponding to the Hall value; calculating an image bias corresponding to the lens bias according to a preset OIS calibration function; and performing image compensation by using the image bias on at least one of a first image captured by the first camera and a second image captured by the second camera at the same time. An electronic device is also provided.

20 Claims, 5 Drawing Sheets

(51) Int. Cl.
  *H04N 17/00*   (2006.01)
  *G06T 7/73*   (2017.01)
  *G06T 7/80*   (2017.01)

(52) U.S. Cl.
  CPC ......... *H04N 5/23287* (2013.01); *H04N 5/247* (2013.01); *H04N 17/002* (2013.01)

(56) References Cited

U.S. PATENT DOCUMENTS

| | | |
|---|---|---|
| 2008/0012946 A1 | 1/2008 | Lee et al. |
| 2015/0350507 A1 | 12/2015 | Topliss et al. |
| 2016/0227120 A1* | 8/2016 | Lee .................... H04N 5/23287 |
| 2016/0360111 A1 | 12/2016 | Thivent et al. |
| 2018/0316840 A1* | 11/2018 | Martin ................. H04N 5/2328 |
| 2018/0376068 A1* | 12/2018 | Shimatani ............ H04N 5/2257 |
| 2019/0028646 A1* | 1/2019 | Wang ........................ G06T 7/55 |

FOREIGN PATENT DOCUMENTS

| | | |
|---|---|---|
| CN | 107040722 A | 8/2017 |
| CN | 107071256 A | 8/2017 |
| CN | 108076291 A | 5/2018 |
| CN | 108876739 A | 11/2018 |
| WO | 2017120771 A1 | 7/2017 |
| WO | 2018076529 A1 | 5/2018 |

OTHER PUBLICATIONS

Extended European search report issued in corresponding European application No. 19173701.4 dated Oct. 29, 2019.

* cited by examiner

IMAGE COMPENSATION METHOD, ELECTRONIC DEVICE AND COMPUTER-READABLE STORAGE MEDIUM

CROSS-REFERENCE TO RELATED APPLICATION(S)

The present application claims priority to Chinese patent application No. 201810623844.X, filed on Jun. 15, 2018, the entire content of which is hereby incorporated by reference.

TECHNICAL FIELD

The present application relates to, but not limited to, the field of information technology, in particular to an image compensation method, an electronic device and a computer-readable storage medium.

BACKGROUND

At present, more and more mobile phones perform depth calculation by using dual cameras, and Optical Image Stabilization, OIS, as an important means to improve the quality of photos taken under low brightness is also increasingly applied to mobile phones. The working principle of OIS is to compensate for jitter through lens movement to achieve image stabilization. However, when the dual-camera OIS function is enabled, image bias will occur in the process of shooting or real-time preview. The image bias brought by the dual-camera OIS function cannot be solved in the known art.

SUMMARY

Implementations of the present application provide an image compensation method, an electronic device, and a computer-readable storage medium.

In one aspect, an implementation of the present application provides an image compensation method, which may include: acquiring a Hall value of an electronic device, wherein the electronic device is provided with a first camera and a second camera, and at least one of the first camera and the second camera is provided with an optical image stabilization system; acquiring a lens bias corresponding to the Hall value; calculating an image bias corresponding to the lens bias according to the preset OIS calibration function; and performing image compensation by using the image bias on at least one of a first image captured by the first camera and a second image captured by the second camera at the same time.

In another aspect, an implementation of the present application provides an electronic device, which may include a storage and a processor, wherein a computer program is stored in the storage, and when the computer program is executed by the processor, the processor performs actions of: acquiring a Hall value of an electronic device, wherein the electronic device is provided with a first camera and a second camera, and at least one of the first camera and the second camera is provided with an optical image stabilization system; acquiring a lens bias corresponding to the Hall value; calculating an image bias corresponding to the lens bias according to the preset OIS calibration function; and performing image compensation by using the image bias on at least one of a first image captured by the first camera and a second image captured by the second camera at the same time.

In yet another aspect, an implementation of the present application provides a computer-readable storage medium which may include a computer program that is executable by a processor to perform actions of: acquiring a Hall value of an electronic device, wherein the electronic device is provided with a first camera and a second camera, and at least one of the first camera and the second camera is provided with an optical image stabilization system; acquiring a lens bias corresponding to the Hall value; calculating an image bias corresponding to the lens bias according to the preset OIS calibration function; and performing image compensation by using the image bias on at least one of a first image captured by the first camera and a second image captured by the second camera at the same time.

The nature and advantages of implementations of the present application may be better understood with reference to the following detailed descriptions and accompanying drawings.

BRIEF DESCRIPTION OF DRAWINGS

The drawings are intended to provide a further understanding of the technical solution of the present application and form a part of the specification. The drawings together with implementations of the present application are used to explain the technical solution of the present application and do not constitute a limitation to the technical solution of the present application.

DETAILED DESCRIPTION

The present application will be described in further detail below with reference to the drawings and implementations. It should be understood that the implementations described herein are only for the purpose of explaining the present application and are not intended to limit the present application.

It should be understood that the terms "first", "second" and the like used in this application may be used herein to describe various elements, but these elements are not limited by these terms. These terms are only used to distinguish one element from another. For example, without departing from the scope of the present application, a first client may otherwise be referred to as a second client, and similarly, a second client may otherwise be referred to as a first client. The first client and the second client are both clients, but they are not the same client.

Figure 1:
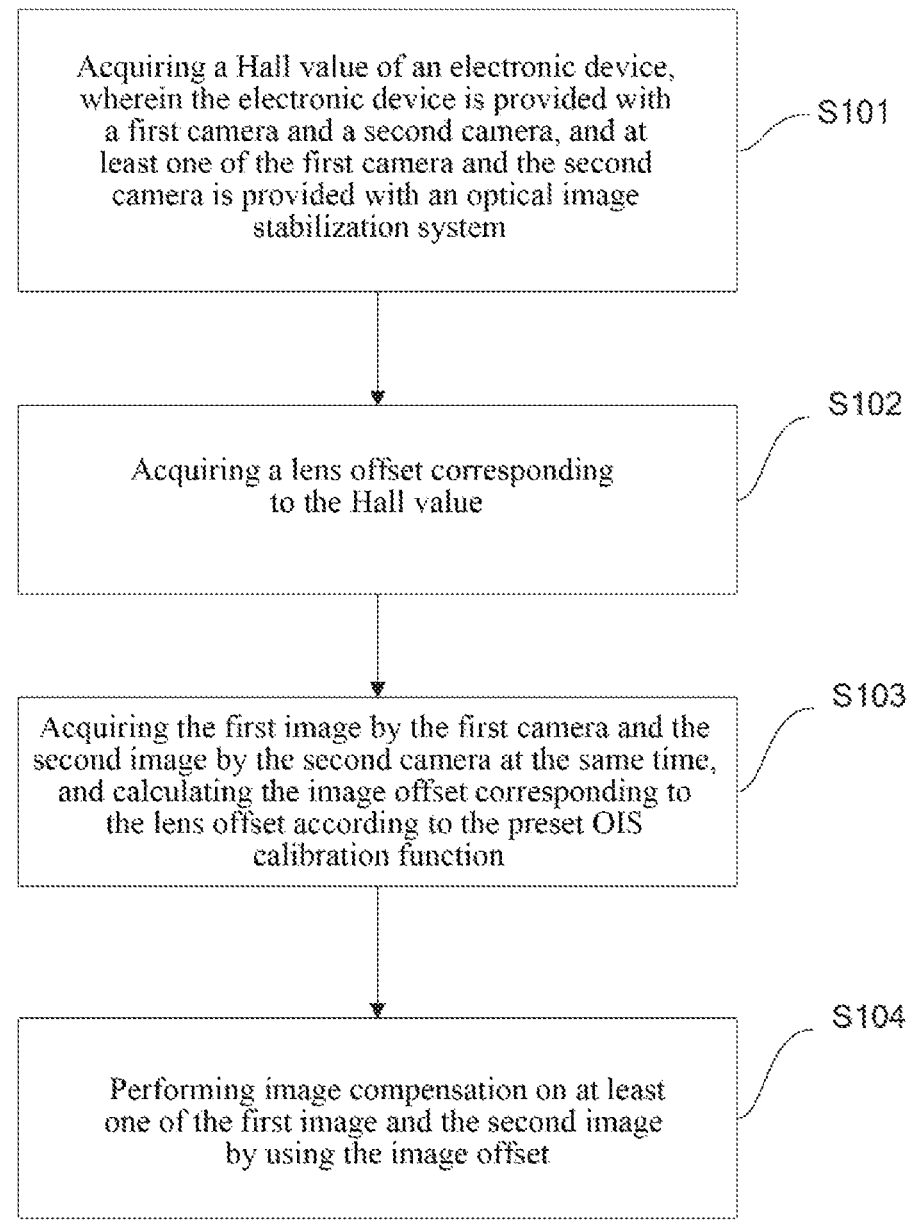
FIG. 1 is a flowchart of an image compensation method according to an implementation.

An implementation of the present application provides an image compensation method. As shown in FIG. 1, the method may include the following actions S101-S104.

In action S101, acquiring a Hall value of an electronic device, wherein the electronic device is provided with a first camera and a second camera, and at least one of the first camera and the second camera is provided with an optical image stabilization system.

The actions of the implementation of the present application may be implemented by an electronic device. The electronic device may be a device with dual cameras, and include but not limited to a photo camera, a video camera, a mobile terminal such as a smart phone, a tablet computer such as a PAD, a personal digital assistant, PDA, a portable device such as a portable computer, a wearable device, etc., and implementations of the present application are not limited thereto. The first camera and the second camera of the dual cameras may be set in parallel on the body of the electronic device.

In the implementation of the application, the dual cameras simulate the human binocular vision principle to perceive a distance, i.e. observing an object from two points to acquire images under different viewing angles, and calculating the bias between pixels by using triangulation measurement principle according to the matching relationship between pixels of the images to acquire the depth of field, DOF, of the object. When one or both of the dual cameras are provided with an OIS system, the lens bias caused by the OIS system leads to change of the calibration parameters of the dual cameras, thereby resulting in problems of parallax and inaccurate DOF calculation. Therefore, the target DOF calculation is corrected or compensated subsequently by using a calibration function.

In an OIS system, a Hall sensor may be used to measure a Hall value in real time when the bias in OIS is generated, and may calculate the magnitude and direction of lens movement at a current time point according to the corresponding relationship between the Hall value and lens movement, that is, bias. The movement may be a movement of the first camera or the second camera in the x direction and/or y direction. The Hall value may be the current/voltage value measured by the Hall sensor, or it may be Hall position information, such as displacement information related to the Hall sensor. The current/voltage value measured by the Hall sensor may be used to determine a principal point bias of the current lens, that is, the lens bias. There is a corresponding relationship between Hall position information and lens bias, including but not limited to: Hall position information is equal to lens bias, or Hall position information has a linear relationship with lens bias, or Hall position information has a non-linear relationship with lens bias.

In action S102, acquiring a lens bias corresponding to the Hall value.

In an exemplary implementation, there may be a linear calibration relationship between the Hall value and the lens bias, satisfying the function $f(x)=ay+b$, wherein x and y respectively represent the Hall value and the lens bias. For example, when $a=1$ and $b=0$, the Hall value is equal to the lens bias, and the lens bias is acquired by acquiring the Hall value. Alternatively, there may be a non-linear relationship, such as a unary quadratic equation or a binary quadratic equation, between the Hall value and the lens bias. In the implementation of the present application, the magnitude of the lens bias at a current time point may be uniquely determined by the known magnitude of the Hall value. In OIS systems, the order of magnitude of the lens bias is in microns.

In an exemplary implementation, the calibration relationship between Hall values and lens biases may be set before the electronic device acquires the Hall value measured by the Hall sensor. However, the present application is not limited thereto. As long as the calibration relationship between Hall values and lens biases is set before the action S102, the lens bias corresponding to the Hall value can be calculated according to the calibration relationship in the action S102.

In action S103, acquiring the first image captured by the first camera and the second image captured by the second camera at the same time, and calculating the image bias corresponding to the lens bias according to the preset OIS calibration function.

In an exemplary implementation, the OIS calibration function may be set by: shooting a target reference at different time points and recording a lens bias and an image bias at each time point; determining an OIS calibration function model according to a corresponding relationship between recorded lens biases and image biases; and inputting the lens biases and the image biases at different time points into the OIS calibration function model to determine an expression of the OIS calibration function.

In an exemplary implementation, before the electronic device acquires the preset OIS calibration function, the method may further include: shooting a target reference at different time points to acquire an image corresponding to a lens bias at each time point, wherein the image contains at least one feature point; detecting the at least one feature point in the image, and calculating an image bias of the image relative to an image at an initial time point according to the position of the at least one feature point in the image; and constructing a calibration relationship table according to lens biases and image biases at different time points, and fitting the OIS calibration function between the lens bias and the image bias according to the calibration relationship table. In the implementation of the application, the OIS calibration function of the lens bias and the image bias may be fitted by setting a calibration function model to determine the calibration function satisfied by the lens biases and the image biases. For example, a fitting curve is drawn in a two-dimensional coordinate system by computer geometry technology, thereby determining the calibration function satisfied by the lens biases and the image biases. For example, it is determined by fitting that the lens biases and the image biases satisfy a linear function model or a non-linear function model such as a binary quadratic equation.

In an exemplary implementation, fitting the OIS calibration function of the lens bias and the image bias according to the calibration relationship table may include: fitting an OIS calibration function model of the lens bias and the image bias according to the calibration relationship table; and inputting lens biases and image biases at different time points as input parameters into the OIS calibration function model, and calculating an expression of the OIS calibration function.

For example, the OIS calibration function may be a linear unary equation, or may be a non-linear unary quadratic equation or a binary quadratic equation, etc., and the implementations of the present application are not limited thereto. For example, assuming that the OIS calibration function model is a binary quadratic equation $f(\Delta x, \Delta y)=ax^2+by^2+cxy+dx+ey+f$, $\Delta x$, $\Delta y$ are image biases in units of pixels, x and y are lens biases in X and Y axes, and a, b, c, d, e and f are parameters. The values of the six parameters a, b, c, d, e and f need to be determined to calculate the expression of the OIS calibration function and fit the corresponding relationship between lens biases and image biases. In the implementation of the present application, six equations are required to measure the values of the six parameters. That is, if $\Delta x$, $\Delta y$ and x, y could be measured, different $\Delta x$, $\Delta y$ and x, y may be selected and input into the equation to solve the values of the six parameters. In other words, at different time points, the same object is shot according to different known lens biases, and Δx and Δy are determined by the displacement of the feature points, also called as target points, in the shot image. For example, the OIS is in an initial start state at time t0, and at the same time the camera position is at point 0; the OIS is moved to six points, i.e., points A (x1, y1), B (x2, y2), C (x3, y3), D (x4, y4), E (x5, y5), F (x6, y6) at six time points of t1 to t6 respectively to shoot six images. By measuring a feature point or a few feature points/a feature block, the feature point/feature block biases (Δx1, Δy1), (Δx2, Δy2), (Δx3, Δy3), (Δx4, Δy4), (Δx5, Δy5), (Δx6, Δy6) of the feature point/feature block with respect to the point 0 in each image can be acquired. Inputting the data of Δx, Δy and x, y into the equation, the values a0, b0, c0, d0, e0 and f0 of the six parameters a, b, c, d, e and f can be solved, thereby the f(Δx, Δy) can be determined, i.e., the expression of the f(Δx, Δy) can be determined as f(Δx, Δy)=a0x2+b0y2+c0xy+d0x+e0y+f0.

In S104, performing image compensation on at least one of the first image and the second image by using the image bias.

For example, if the image bias calculated currently is one pixel bias in the positive direction of the X axis, when the image compensation is performed, the entire image will be shifted by one pixel in the negative direction of the X axis to realize image compensation.

For example, if the first camera is provided with an OIS system and the second camera is not provided with an OIS system, image compensation may be only performed on the first image.

In the implementation of the present application, image data and Hall values are synchronous strictly according to the time sequence, that is, timestamps. For example, if images are captured at 30 Hz and Hall values are acquired at 200 Hz at the same time, an image will correspond to 6 to 7 Hall values in time sequence.

In an exemplary implementation, before acquiring the Hall value of the electronic device, the method may further include: acquiring angular velocity information of a gyroscope, wherein the angular velocity information corresponds to Hall values in time sequence. In the OIS system, the gyroscope is used to identify the movement or inclination of the electronic device in different directions. An OIS motor will reverse the bias for certain degrees according to the data given by the gyroscope at different time points to ensure that the jitter of the device body or lens caused by shake of hand is counteracted. As such, acquired Hall values are synchronous with the gyroscope data in time sequence.

In an exemplary implementation, the operation of acquiring the Hall value of the electronic device may include: selecting at least one piece of the angular velocity information, and acquiring at least one Hall value corresponding to the at least one piece of the angular velocity information.

In an exemplary implementation, the angular velocity information includes angular velocity values, and selecting at least one piece of the angular velocity information includes: selecting at least one angular velocity value from acquired angular velocity information. For example, at least one angular velocity value may be selected according to a variance of angular velocity values or a sum of angular velocity values.

For example, among multiple angular velocity values, a set of angular velocity values with the smallest variance or the smallest sum may be selected, and the image bias for calibration may be calculated using the Hall value corresponding to the set of angular velocity values, and the image bias may be used to compensate the image.

For example, an image frame corresponds to multiple Hall values, and each Hall value corresponds to a set of angular velocity values, i.e., Hall values are synchronous with angular velocity values in time sequence but with different frequencies. A set of angular velocity values is firstly selected, then the image bias is calculated using the Hall value corresponding to the selected set of angular velocity values instead of all Hall values, and then the image frame is compensated. When a set of angular velocity values is selected, the variance or sum of a set of angular velocity values corresponding to each Hall value is calculated, and the set of angular velocity values with the smallest variance or sum is selected, and then the image bias is calculated using the Hall value corresponding to the set of angular velocity values.

Alternatively, if an image frame corresponds to multiple Hall values and each Hall value corresponds to one angular velocity value, the average value of all angular velocity values corresponding to the image frame may be calculated, and the angular velocity value with the smallest difference from the average value may be selected, and then the image bias may be calculated using the Hall value corresponding to the selected angular velocity value.

In an exemplary implementation, image biases corresponding to at least two Hall values may be used to correct an image frame, in which case, the at least two Hall values may be set to correspond to different regions of the image frame, and image compensation may be performed on the different regions using the image biases, respectively. In an exemplary implementation, when an image frame is acquired by a progressive scan, all lines of the image frame are evenly divided to the at least two Hall values. For example, six image biases corresponding to six Hall values may be used to correct the image frame. Since dual cameras adopt the CMOS progressive scan to acquire images, image compensation is performed on regions of different lines corresponding to different Hall values. For example, assuming that there are currently six Hall values of Hall 1-Hall 6, and each Hall value corresponds to a unique image bias, denoted as bias pixel 1-bias pixel 6, if CMOS scans six lines, then the image of the six lines may be corrected by using bias pixel 1-bias pixel 6, respectively. If CMOS scans sixty lines, then the image of the sixty lines may be corrected in blocks, that is, the sixty lines are divided into six blocks, each block includes 10 lines, and the image of six blocks may be corrected block by block by using bias pixel 1-bias pixel 6, respectively. In another words, the image of the first block including 10 lines may be corrected by using bias pixel 1 as a correction parameter, the image of the second block including 10 lines may be corrected by using bias pixel 2 as a correction parameter, and so on, until the image of the sixth block including 10 lines is corrected by using bias pixel 6 as a correction parameter.

In an exemplary implementation, after the image compensation is completed, the electronic device may also calculate DOF information based on the compensated image (s).

Figure 2:
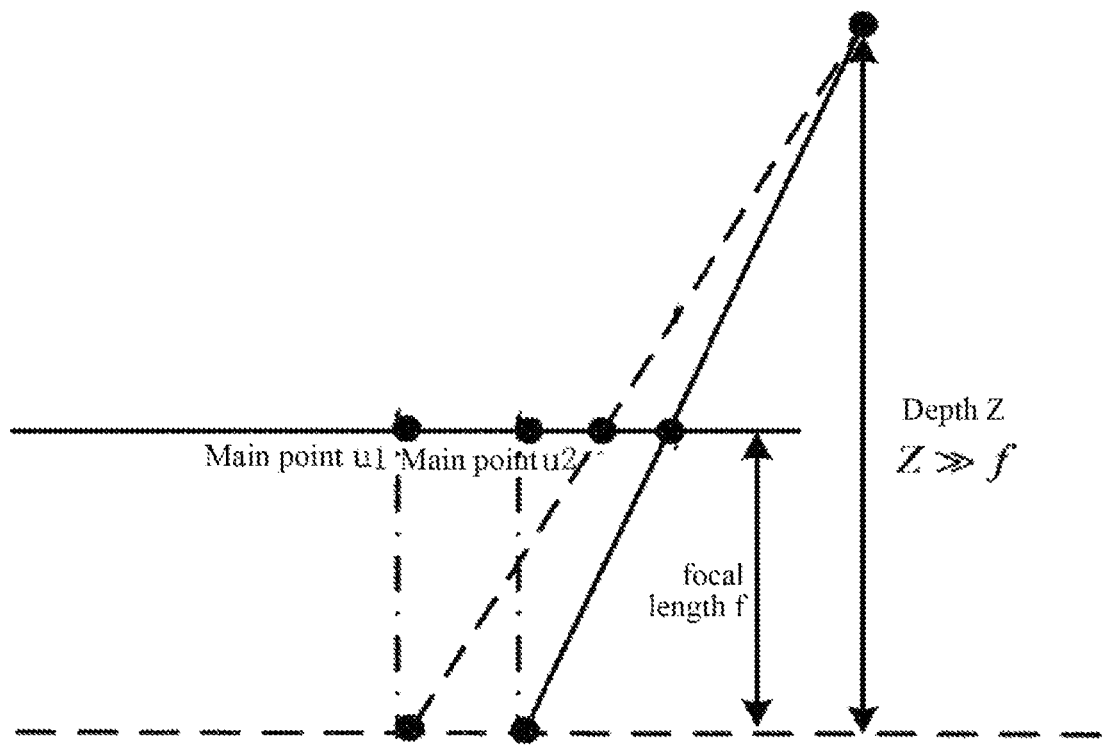
FIG. 2 is a schematic diagram of image changes before and after lens bias according to an implementation.

FIG. 2 is a schematic diagram of imaging changes before and after lens bias. For example, if the lens of a camera is driven by an OIS motor, as shown in FIG. 2, before the lens moves, the camera calibration parameters are: focal length f, and principal point u1. After OIS is started, it causes the lens to move, the principal point is changed to u2, then the lens bias is Δu=u2−u1 in units of microns. In an actual procedure, Δu is derived according to the corresponding relationship between Hall values and lens biases. The image bias (Δx, Δy) corresponding to the lens bias Δu may be calculated by using the OIS calibration function, and image correction, i.e., image compensation, may be performed by using (Δx, Δy), and DOF may be calculated by using the triangulation measurement. The triangulation measurement is a conventional algorithm for calculating DOF, and thus is not repeated in the implementations of this application.

In the implementation of the present application, an image bias is acquired by using the corresponding relationship between Hall values and lens biases and the calibration relationship between lens biases and image biases. Compared with the scheme of acquiring the lens bias by acquiring the optical center bias, which is in unit of code, the implementation of the present application acquires a more intuitive Hall value and reversely calculates the lens bias through the Hall value, therefore the calculation complexity is low and the implementation is simple. In addition, after multiple Hall values and an image frame are acquired at the same time, the implementation of the present application inventively proposes to select, according to different angular velocity values, that is gyro values, acquired by the gyroscope, at least one image bias corresponding to at least one Hall value to perform correction on the image frame by line or block, which not only improves the accuracy of image correction, but also considers the efficiency and calculation amount of image correction and improves the utilization of calculation resources to a certain extent.

In the implementation of the application, through the calibration relationship between the Hall value and the image bias, the image bias is corrected in the process of image shooting or real-time preview, the influence on the DOF calculation is eliminated, and the effect of background blur under OIS is improved.

Figure 3:
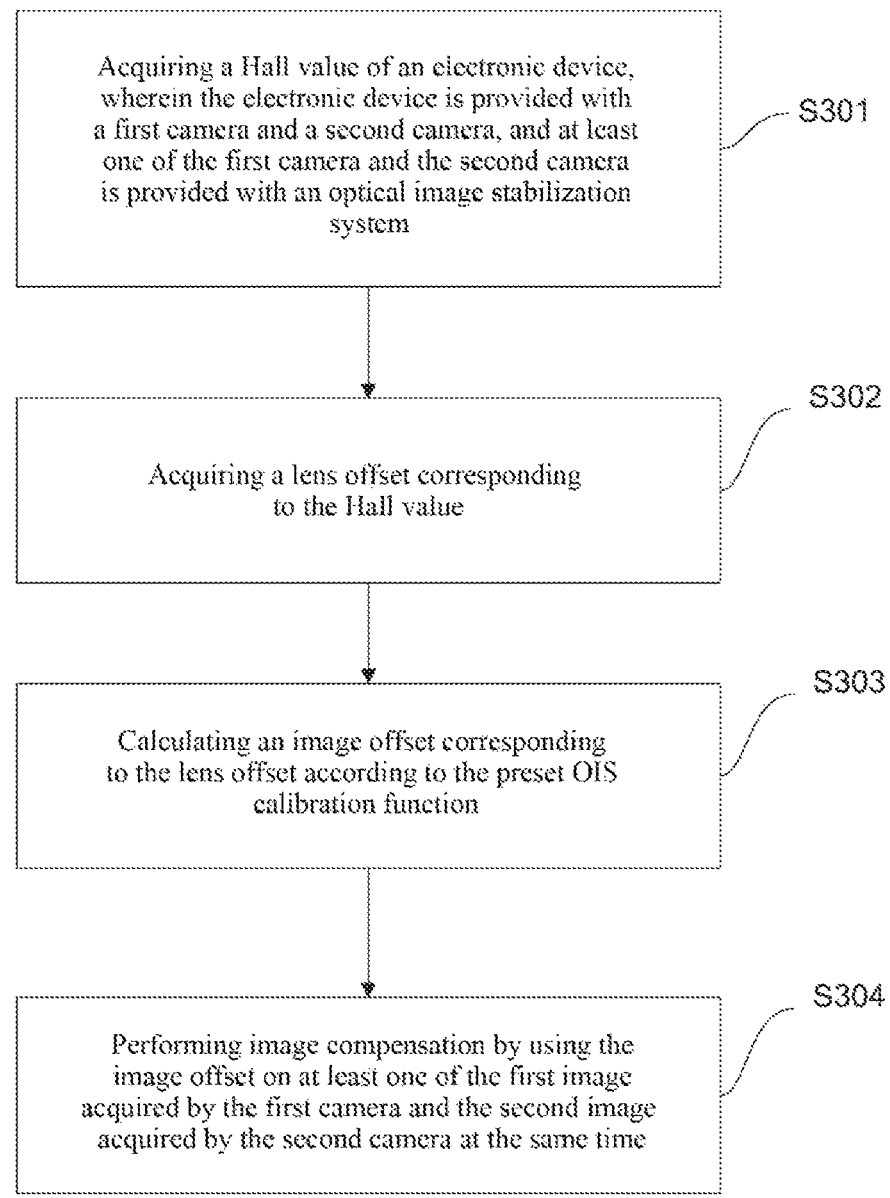
FIG. 3 is a flowchart of an image compensation method according to an implementation.

An implementation of the present application provides an image compensation method, as shown in FIG. 3, which may include the following actions S301-S304.

In action S301, acquiring a Hall value of an electronic device, wherein the electronic device is provided with a first camera and a second camera, and at least one of the first camera and the second camera is provided with an optical image stabilization system.

In action S302, acquiring a lens bias corresponding to the Hall value.

In action S303, calculating an image bias corresponding to the lens bias according to a preset OIS calibration function.

In action S304, performing image compensation by using the image bias on at least one of a first image captured by the first camera and a second image captured by the second camera at the same time.

Actions S301-S302 and S304 are consistent with actions S101-S102 and S104 in FIG. 1, and reference may be made to the relevant descriptions of actions S101-S102 and S104 in the previous implementations.

In action S303, the implementation of calculating the image bias corresponding to the lens bias according to the preset OIS calibration function is consistent with the implementation of calculating the image bias corresponding to the lens bias according to the preset OIS calibration function in action S103 in the previous implementations, and reference may be made to the relevant description of action S103 in the previous implementations.

In this implementation, the time point of acquiring the first image captured by the first camera and the second image captured by the second camera at the same time is not limited. As long as the first image captured by the first camera and the second image captured by the second camera at the same time are acquired before image compensation is performed, the image compensation can be implemented in this implementation.

Except that the time point of acquiring the first image and the second image is not limited in action S303, other technical features in this implementation are consistent with those in the previous implementations, and the relevant descriptions in the previous implementations may be referred to.

Figure 4:
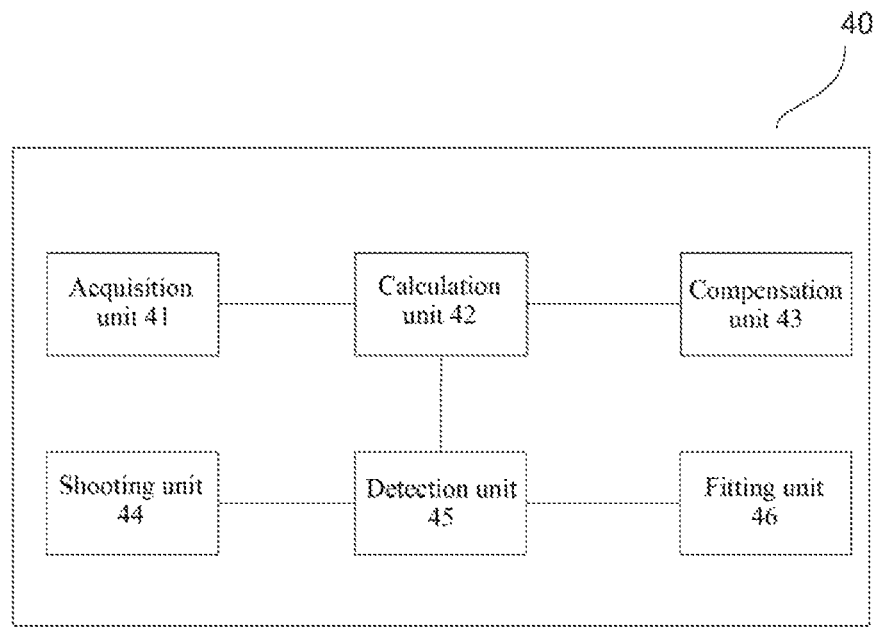
FIG. 4 is a schematic structural diagram of an image compensation apparatus according to an implementation.

An implementation of the present application provides an image compensation apparatus 40. As shown in FIG. 4, the image compensation apparatus 40 may include an acquisition unit 41, a calculation unit 42 and a compensation unit 43.

The acquisition unit 41 is configured to acquire a Hall value. The image compensation apparatus is provided with a first camera and a second camera, and at least one of the first camera and the second camera is provided with an optical image stabilization, OIS, system.

The OIS system may include: an OIS controller, a gyroscope, a Hall sensor, a motor and a camera.

The camera includes the first camera and the second camera. The first camera and the second camera may be provided in front of the electronic device in parallel or on the back of the electronic device in parallel, and the arrangement of the first camera and the second camera may be horizontal or vertical. At least one of the first camera and the second camera is provided with the OIS system, and the first camera and the second camera have lenses respectively.

The Hall sensor is a magnetic field sensor for displacement detection based on the Hall effect, and is configured to acquire the Hall value, and acquire the lens bias of the camera with OIS system, i.e. the lens bias of at least one of the first camera and the second camera, through the corresponding relationship between Hall values and lens biases.

The gyroscope is a positioning system based on the movement of electronic device in free space, and is configured to acquire angular velocity information when the electronic device jitters. Angular velocity information corresponds to Hall values in time sequence. For example, an angular value at a time point corresponds to a Hall value the same time point.

OIS controller acquires angular velocity information from the gyroscope, converts angular velocity information into jitter amplitude of electronic device, and sends the jitter amplitude as a reference signal to the motor.

The motor may be an OIS motor and is configured to drive the lens of a camera with an OIS system to move according to the jitter amplitude to ensure the clarity of the image.

The OIS controller, which may be the acquisition unit 41 in the implementation of the present application, acquires the first image and the second image by shooting the target scene at the same time by using the first camera and the second camera, respectively. The OIS controller also acquires the Hall value acquired by the Hall sensor and the angular velocity information acquired by the gyroscope at the same time, and outputs the information to the calculation unit 42.

When the acquisition unit 41 acquires multiple Hall values during acquiring the first image and the second image, the acquisition unit 41 is further configured to acquire angular velocity information corresponding to the Hall values.

The calculation unit 42 is configured to calculate the image bias corresponding to the lens bias according to a preset OIS calibration function.

In the implementation of the present application, the calculation unit 42 may be a general purpose processor CPU, or an image processor GPU, or an image signal processor, ISP.

Hall values and the calibration relationship between lens biases and image biases are introduced and described in previous implementations, which will not be repeated here.

The compensation unit 43 is configured to perform image compensation by using the image bias on at least one of the first image captured by the first camera and the second image captured by the second camera at the same time.

The acquisition unit 41 is further configured to acquire the lens bias corresponding to the Hall value.

The calculation unit 42 is further configured to acquire the preset OIS calibration function and calculate an image bias corresponding to the lens bias according to the OIS calibration function.

In addition, the image compensation apparatus 40 also includes a shooting unit 44, a detection unit 45 and a fitting unit 46.

The shooting unit 44 is configured to shoot a target reference at different time points to acquire an image corresponding to the lens bias at each time point. The image contains at least one feature point.

The detection unit 45 is configured to detect the at least one feature point in the image, and calculate the image bias of the image with respect to an image at an initial time point according to the position of the at least one feature point in the image.

The fitting unit 46 is configured to construct a calibration relationship table according to the lens biases and the image biases at the different time points, and fit an OIS calibration function between the lens bias and the image bias according to the calibration relationship table. The fitting unit 46 may fit the OIS calibration function of the lens bias and the image bias according to the calibration relationship table in the following way: fitting an OIS calibration function model of the lens bias and the image bias according to the calibration relationship table; and inputting the lens biases and the image biases at different time points as input parameters into the OIS calibration function model to determine an expression of the OIS calibration function.

In addition, the calculation unit 42 is further configured to set a calibration relationship between Hall values and lens biases, and calculate the lens bias corresponding to the Hall value according to the calibration relationship.

The compensation unit 43 is further configured to perform image compensation by using the image bias on at least one of the first image acquired by the first camera and the second image acquired by the second camera at the same time.

Figure 5:
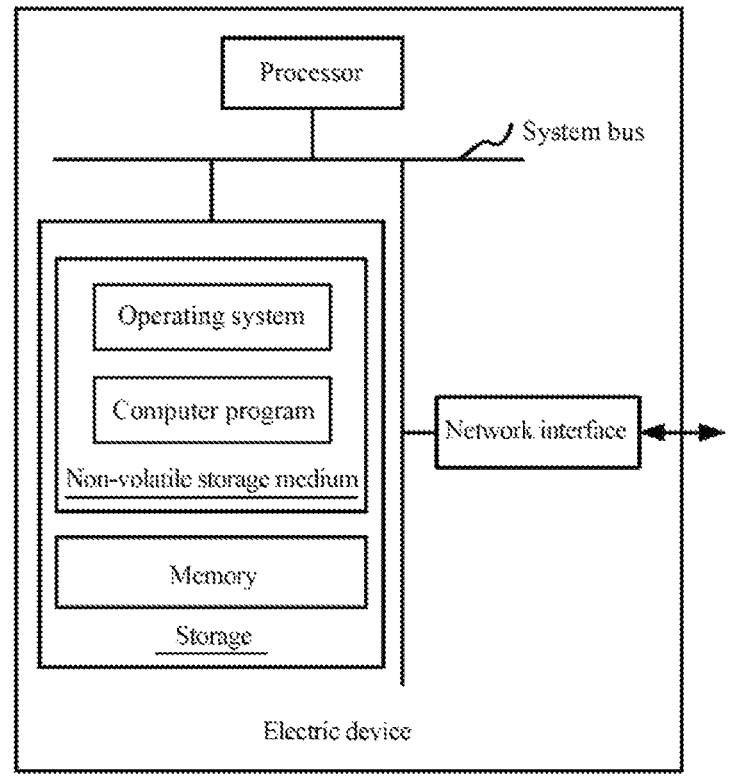
FIG. 5 is a schematic diagram of the internal structure of an electronic device according to an implementation.

In addition, it should be noted that the calculation unit 42 is further configured to calculate the DOF information according to at least one of the first image and the second image that is compensated. The electronic device may be a terminal, such as a mobile terminal. FIG. 5 is a schematic diagram of the internal structure of the electronic device. As shown in FIG. 5, the electronic device includes a processor, a storage and a network interface which are connected through a system bus. The processor is configured to provide computing and control capabilities to support the operation of the entire electronic device. The storage is configured to store data, programs and the like, and at least one computer program is stored on the storage and may be executed by the processor to implement the image compensation method suitable for the electronic device provided in the implementations of the present application. The storage may include a non-volatile storage medium and a memory. The non-volatile storage medium stores an operating system and a computer program. The computer program may be executed by the processor to implement an image compensation method provided in the foregoing implementations. The memory provides a cached operating environment for operating system and computer program in non-volatile storage medium. The network interface may be an Ethernet card or a wireless card, etc. for communicating with external electronic devices. The electronic device may be a mobile terminal, a tablet computer or a personal digital assistant or a wearable device, etc.

In an exemplary implementation, the electronic device may include a storage and a processor. A computer program is stored in the storage, and when the computer program is executed by the processor, the processor performs the following operations: acquiring a Hall value of an electronic device, wherein the electronic device is provided with a first camera and a second camera, and at least one of the first camera and the second camera is provided with an optical image stabilization, OIS, system; acquiring a lens bias corresponding to the Hall value; calculating an image bias corresponding to the lens bias according to a preset OIS calibration function; and performing image compensation by using the image bias on at least one of a first image captured by the first camera and a second image captured by the second camera at the same time.

In an exemplary implementation, when the computer program is executed by the processor, the processor further performs the following operations: acquiring angular velocity information of a gyroscope, wherein the angular velocity information corresponds to Hall values in time sequence; selecting at least one piece of the angular velocity information, and acquiring the Hall value corresponding to the at least one piece of the angular velocity information.

In an exemplary implementation, the angular velocity information includes angular velocity values, and when the computer program is executed by the processor, the processor further performs the following operation: selecting at least one angular velocity value according to a variance or a sum of angular velocity values.

In an exemplary implementation, when the computer program is executed by the processor, the processor further performs the following operation: setting the OIS calibration function in the following way: shooting a target reference at different time points and recording a lens bias and an image bias of the image at each time point; determining an OIS calibration function model according to a corresponding relationship between recorded lens biases and image biases; and inputting the lens biases and the image biases at different time points into the OIS calibration function model to determine an expression of the OIS calibration function.

In an exemplary implementation, when the computer program is executed by the processor, the processor further performs the following operations: shooting a target reference at different time points to acquire an image corresponding to the lens bias at each time point, wherein the image contains at least one feature point; detecting the at least one feature point in the image, and according to the position of the at least one feature point in the image, calculating an image bias of the image relative to an image at an initial time point; and constructing a calibration relationship table according to lens biases and image biases at different time points, and fitting the OIS calibration function between the lens bias and the image bias according to the calibration relationship table.

In an exemplary implementation, when the computer program is executed by the processor, the processor further performs the following operations: setting a calibration relationship between Hall values and lens biases, and calculating the lens bias corresponding to the Hall value according to the calibration relationship.

In an exemplary implementation, images captured by at least one of the first camera and the second camera are synchronous with Hall values in time sequence, and an image frame of at least one of the first image and the second image corresponds to at least two Hall values. When the computer program is executed by the processor, the processor further performs the following operations: configuring the at least two Hall values to correspond to different regions of an image frame to be compensated, and performing the image compensation on the different regions respectively by using image biases corresponding to the different regions.

In an exemplary implementation, when the computer program is executed by the processor, the processor further performs the following operations: when the image frame is acquired by progressive scan, evenly dividing all lines of the image frame to the at least two Hall values.

An implementation of the present application also provides a computer-readable storage medium storing computer-executable instructions that, when executed by one or more processors, enables the one or more processors to perform the actions of any image compensation method in the implementations described above.

An implementation of the present application also provides a computer program product containing instructions that, when running on a computer, cause the computer to perform any image compensation method in the implementations described above.

Figure 6:
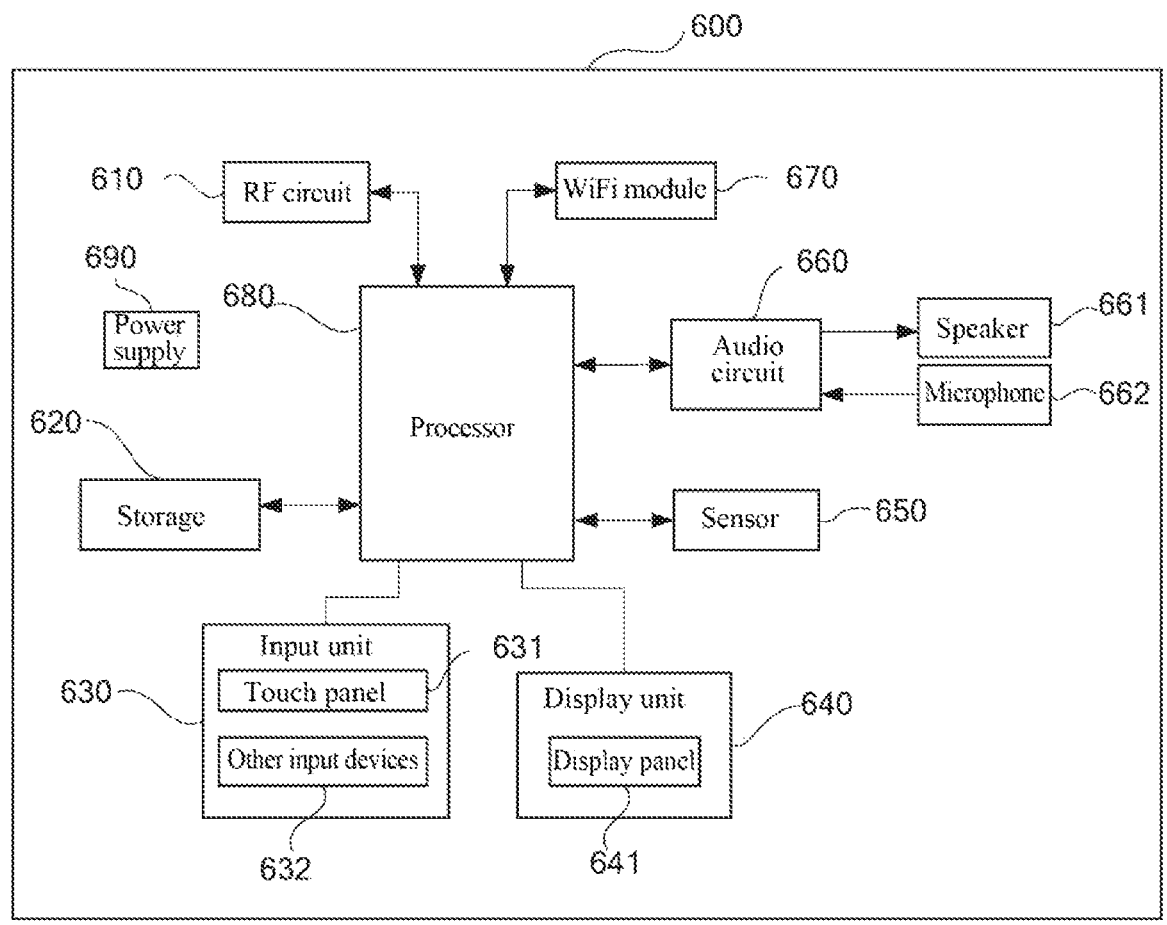
FIG. 6 is a block diagram of partial structure of a mobile terminal according to an implementation.

An implementation of the application also provides an electronic device. As shown in FIG. 6, for ease of explanation, only the part of the electronic device related to the implementation of the present application is shown, and the methods described in previous implementations of the present application may be referred to for specific technical details that are not described in this implementation. The electronic device may be any terminal device including a mobile terminal, a tablet computer, a Personal Digital Assistant, PDA, a Point of Sales, POS, a car computer, a wearable device, etc.

FIG. 6 is a block diagram of a part of the structure of the mobile terminal provided by the implementation of the present application. Referring to FIG. 6, the mobile terminal includes radio frequency, RF circuit 610, storage 620, input unit 630, display unit 640, sensor 650, audio circuit 660, wireless fidelity, wifi module 670, processor 680, and power supply 690, etc. Those skilled in the art may understand that the mobile terminal structure shown in FIG. 6 does not constitute a limitation to a mobile terminal, which may include more or fewer components than shown, or some combined components, or different component arrangements.

The RF circuit 610 may be configured to receive and transmit signals or receive and transmit information in a call, and receive downlink information from the base station and then send it to the processor 680 for processing. Or the RF circuit 610 may be configured to transmit the uplink data to the base station. Generally, the RF circuit includes, but is not limited to, antennas, at least one amplifier, a transceiver, a coupler, a low noise amplifier, LNA, a duplexer, etc. In addition, RF circuit 610 may also communicate with the network and other devices through wireless communication. The above wireless communication may use any communication standard or protocol, including but not limited to global system of mobile communication, GSM, general packet radio service, GPRS, code division multiple access, CDMA, wideband code division multiple access, WCDMA, long term evolution, LTE, e-mail, short messaging service, SMS, etc.

The storage 620 may be configured to store software programs and software modules. The processor 680 executes various functional applications and data processing of the mobile terminal by running the software programs and modules stored in the storage 620. The storage 620 may mainly include a program storage area and a data storage area. The program storage area may store an operating system, an application program required for at least one function such as an application program of a sound playing function, an application program of an image playing function, etc. The data storage area may store data such as audio data, address book, etc. created according to the use of the mobile terminal. In addition, the storage 620 may include high-speed random access memory, and may also include non-volatile memory, such as at least one disk memory device, flash memory device, or other volatile solid-state memory device.

The input unit 630 may be configured to receive input digital or character information, and generate key signal inputs related to user settings and function control of the mobile terminal 600. Specifically, the input unit 630 may include a touch panel 631 and other input devices 632. The touch panel 631, also known as a touch screen, may collect user's touch operations on or near the touch panel 631 such as the user's operations on or near the touch panel 631 by using any suitable object or accessory such as a finger or stylus, and drive the corresponding connection device according to a preset program. In one implementation, the touch panel 631 may include two parts, a touch detection device and a touch controller. The touch detection device detects the touch position of the user, detects the signal brought by the touch operation, and transmits the signal to the touch controller. The touch controller receives touch information from the touch detection device, converts it into contact coordinates, and sends it to the processor 680, and may receive and execute commands from the processor 680. In addition, the touch panel 631 may be implemented in various types such as resistive, capacitive, infrared and surface acoustic waves. In addition to the touch panel 631, the input unit 630 may also include other input devices 632. In particular, other input devices 632 may include, but are not limited to, one or more of a physical keyboard, function keys such as volume control keys, switch keys, etc., or the like.

The display unit 640 may be configured to display information input by the user or information provided to the user and various menus of the mobile terminal. The display unit 640 may include a display panel 641. In one implementation, the display panel 641 may be provided in the form of a liquid crystal display, LCD, an organic light-emitting diode, OLED, etc. In one implementation, the touch panel 631 may cover the display panel 641, and when the touch panel 631 detects a touch operation on or near it, the touch operation is transmitted to the processor 680 to determine the type of touch event, and then the processor 680 provides a corresponding visual output on the display panel 641 according to the type of touch event. Although in FIG. 6, the touch panel 631 and the display panel 641 are two independent components to realize the input and output functions of the mobile terminal, in some implementations, the touch panel 631 and the display panel 641 may be integrated to realize the input and output functions of the mobile terminal.

The mobile terminal 600 may also include at least one sensor 650, such as a light sensor, a motion sensor, and other sensors. The light sensor may include an ambient light sensor and a proximity sensor. The ambient light sensor may adjust the brightness of the display panel 641 according to the brightness of ambient light. The proximity sensor may turn off the display panel 641 and/or backlight when the mobile terminal moves near to the ear. The motion sensor may include an acceleration sensor, through which the magnitude of acceleration in all directions may be detected. The motion sensor may detect the magnitude and direction of gravity in static condition, and may be used to identify applications of mobile terminal posture such as horizontal and vertical screen switching, vibration identification related functions such as pedometer, tap, etc. In addition, the mobile terminal may also be provided with other sensors, such as a gyroscope, a barometer, a hygrometer, a thermometer, an infrared sensor, etc.

Audio circuit 660, speaker 661 and microphone 662 may provide an audio interface between the user and the mobile terminal. The audio circuit 660 may transmit the electrical signal converted from received audio data to the speaker 661, and then the speaker 661 converts it into a sound signal for output. On the other hand, the microphone 662 converts the collected sound signal into an electrical signal, and then the electrical signal is received by the audio circuit 660 and converted into audio data. After that the audio data are output to the processor 680 for processing, and then are sent to another mobile terminal via the RF circuit 610, or are output to the storage 620 for subsequent processing.

WiFi is a short-range wireless transmission technology. The mobile terminal may help users to send and receive e-mails, browse web pages and access streaming media and the like through WiFi module 670. The WiFi module 670 provides users with wireless broadband Internet access. Although FIG. 6 shows the WiFi module 670, it may be understood that the WiFi module 670 is not the necessary configuration of the mobile terminal 600, and may be omitted as needed.

The processor 680 is the control center of the mobile terminal, connects various parts of the entire mobile terminal with various interfaces and lines, and performs various functions and data processing of the mobile terminal by running or executing software programs and/or modules stored in the storage 620 and invoking data stored in the storage 620, thereby performing overall monitoring of the mobile terminal. In one implementation, the processor 680 may include one or more processing units. In one implementation, the processor 680 may integrate an application processor and a modem processor. The application processor mainly processes an operating system, a user interface, an application program, and the like. The modem processor mainly handles wireless communication. It will be understood that the modem processor described above may not be integrated into the processor 680.

The mobile terminal 600 also includes a power supply 690 such as a battery for supplying power to various components. Alternatively, the power supply may be logically connected to the processor 680 through the power management system, so that functions such as charge management, discharge management, and power consumption management may be realized through the power management system.

In one implementation, the mobile terminal 600 may also include a camera, a Bluetooth module, etc.

In the implementation of the present application, the processor 680 included in the electronic device performs the actions of the method of image compensation when executing the computer program stored in the memory.

Any references to memory, storage, databases, or other media used in this application may include non-volatile and/or volatile memory. The non-volatile memory may include read only memory, ROM, programmable ROM, PROM, electrically programmable ROM, EPROM, electrically erasable programmable ROM, EEPROM, or flash memory. Volatile memory may include random access memory, RAM, as an external cache memory. By way of illustration and not limitation, RAM is available in various forms, such as static RAM, SRAM, dynamic RAM, DRAM, synchronous DRAM, SDRAM, double data rate SDRAM, DDR SDRAM, enhanced SDRAM, ESDRAM, synchronous link DRAM, SLDRAM, memory bus direct RAM, RDRAM, direct memory bus dynamic RAM, DRDRAM, and memory bus dynamic RAM, RDRAM.

The implementations described above only provide several implementations of this application, and their descriptions are relatively specific and detailed, but they are not to be construed as limiting the protection scope of this application. It should be noted that for those of ordinary skill in the art, modifications and improvements may be made without departing from the concept of this application, which fall within the protection scope of this application. The protection scope of this application is defined by the appended claims.

What is claimed is:

1. A method for image compensation, comprising:
acquiring a Hall value of an electronic device, wherein the electronic device is provided with a first camera and a second camera, and at least one of the first camera and the second camera is provided with an optical image stabilization (OIS) system;
acquiring a lens bias corresponding to the Hall value;
calculating an image bias corresponding to the lens bias according to a preset OIS calibration function; and
performing image compensation by using the image bias on at least one of a first image captured by the first camera and a second image captured by the second camera at the same time.

2. The method according to claim 1, further comprising: in response to acquiring the lens bias corresponding to the Hall value, acquiring the first image captured by the first camera and the second image captured by the second camera at the same time.

3. The method according to claim 1, further comprising: acquiring angular velocity information of a gyroscope, wherein acquiring the Hall value of the electronic device comprises:
selecting at least one piece of the angular velocity information, and acquiring the Hall value corresponding to the at least one piece of the angular velocity information.

4. The method according to claim 3, wherein the angular velocity information comprises angular velocity values, and selecting at least one piece of the angular velocity information comprises selecting at least one angular velocity value.

5. The method according to claim 1, further comprising: setting the preset OIS calibration function by:
shooting a target reference at different time points, and recording a lens bias and an image bias at each time point;
determining an OIS calibration function model according to a corresponding relationship between recorded lens biases and image biases; and inputting the lens biases and the image biases at the different time points into the OIS calibration function model to determine an expression of the preset OIS calibration function.

6. The method according to claim 1, further comprising:
shooting a target reference at different time points to acquire an image corresponding to a lens bias at each time point, wherein the image contains at least one feature point;
detecting the at least one feature point in the image, and according to a position of the at least one feature point in the image, calculating an image bias of the image relative to an image at an initial time point; and
constructing a calibration relationship table according to lens biases and image biases at the different time points, and fitting the preset OIS calibration function between the lens bias and the image bias according to the calibration relationship table.

7. The method according to claim 6, wherein fitting the preset OIS calibration function between the lens bias and the image bias according to the calibration relationship table comprises:
fitting an OIS calibration function model of the lens bias and the image bias according to the calibration relationship table; and
inputting the lens biases and image biases at the different time points into the OIS calibration function model to determine an expression of the preset OIS calibration function.

8. The method according to claim 1, further comprising:
setting a calibration relationship between Hall values and lens biases,
wherein acquiring the lens bias corresponding to the Hall value comprises:
calculating the lens bias corresponding to the Hall value according to the calibration relationship.

9. The method according to claim 1, wherein an image frame of at least one of the first image and the second image corresponds to at least two Hall values.

10. The method according to claim 9, wherein performing image compensation by using the image bias on at least one of the first image and the second image comprises:
configuring the at least two Hall values to correspond to different regions of an image frame to be compensated, and performing image compensation on the different regions respectively by using image biases corresponding to the different regions.

11. The method according to claim 10, wherein configuring the at least two Hall values to correspond to different regions of the image frame comprises:
when the image frame is acquired by progressive scan, evenly dividing all lines of the image frame to the at least two Hall values.

12. An electronic device comprising a storage and a processor, wherein a computer program is stored in the storage, and when the computer program is executed by the processor, the processor performs actions of:
acquiring a Hall value of an electronic device, wherein the electronic device is provided with a first camera and a second camera, and at least one of the first camera and the second camera is provided with an optical image stabilization (OIS) system;
acquiring a lens bias corresponding to the Hall value;
calculating an image bias corresponding to the lens bias according to a preset OIS calibration function; and
performing image compensation by using the image bias on at least one of a first image captured by the first camera and a second image captured by the second camera at the same time.

13. The electronic device according to claim 12, wherein when the computer program is executed by the processor, the processor further performs an action of: acquiring angular velocity information of a gyroscope; and
wherein acquiring the Hall value of the electronic device comprises: selecting at least one piece of the angular velocity information, and acquiring the Hall value corresponding to the at least one piece of the angular velocity information.

14. The electronic device according to claim 13, wherein the angular velocity information comprises angular velocity values, and selecting at least one piece of the angular velocity information comprises: selecting at least one angular velocity value.

15. The electronic device according to claim 12, wherein when the computer program is executed by the processor, the processor further performs an action of: setting the preset OIS calibration function by:
shooting a target reference at different time points and recording a lens bias and an image bias at each time point;
determining an OIS calibration function model according to a corresponding relationship between recorded lens biases and image biases; and
inputting the lens biases and the image biases at the different time points into the OIS calibration function model to determine an expression of the preset OIS calibration function.

16. The electronic device according to claim 12, wherein when the computer program is executed by the processor, the processor further performs actions of:
shooting a target reference at different time points to acquire an image corresponding to a lens bias at each time point, wherein the image contains at least one feature point;
detecting the at least one feature point in the image, and according to a position of the at least one feature point in the image, calculating an image bias of the image relative to an image at an initial time point; and
constructing a calibration relationship table according to lens biases and image biases at the different time points, and fitting the preset OIS calibration function between the lens bias and the image bias according to the calibration relationship table.

17. The electronic device according to claim 12, wherein when the computer program is executed by the processor, the processor further performs an action of: setting a calibration relationship between Hall values and lens biases; and
wherein acquiring the lens bias corresponding to the Hall value comprises: calculating the lens bias corresponding to the Hall value according to the calibration relationship.

18. The electronic device according to claim 12, wherein an image frame of at least one of the first image and the second image corresponds to at least two Hall values; and
wherein performing image compensation by using the image bias on at least one of the first image and the second image comprises:
configuring the at least two Hall values to correspond to different regions of an image frame to be compensated, and performing image compensation on the different regions respectively by using image biases corresponding to the different regions.

19. The electronic device according to claim 18, wherein configuring the at least two Hall values to correspond to different regions of the image frame comprises:
 when the image frame is acquired by a progressive scan, evenly dividing all lines of the image frame to the at least two Hall values.

20. A non-transitory computer-readable storage medium, comprising a computer program that is executable by a processor to perform actions of:
 acquiring a Hall value of an electronic device, wherein the electronic device is provided with a first camera and a second camera, and at least one of the first camera and the second camera is provided with an optical image stabilization (OIS) system;
 acquiring a lens bias corresponding to the Hall value;
 calculating an image bias corresponding to the lens bias according to a preset OIS calibration function; and
 performing image compensation by using the image bias on at least one of a first image captured by the first camera and a second image captured by the second camera at the same time.

* * * * *